United States Patent [19]

Wien

[11] Patent Number: 5,156,101
[45] Date of Patent: Oct. 20, 1992

[54] TREE TRANSPLANTER

[76] Inventor: Harlan V. Wien, Rte. 2, Box 54, Perham, Minn. 56573

[21] Appl. No.: 781,299

[22] Filed: Oct. 23, 1991

[51] Int. Cl.$^5$ .............................................. A01C 11/02
[52] U.S. Cl. ................................... 111/101; 111/106; 111/200; 294/50.7
[58] Field of Search ............... 111/101, 106, 200, 919, 111/900; 294/50.7, 50.8; 37/2 R; 171/5, 50, 55, 59, 103

[56] References Cited

U.S. PATENT DOCUMENTS

| | | | |
|---|---|---|---|
| 69,642 | 10/1867 | Disbrow . | |
| 103,082 | 5/1870 | Roberts et al. | 294/50.8 |
| 147,977 | 2/1874 | Race . | |
| 155,036 | 9/1874 | McLeod . | |
| 594,668 | 11/1897 | Wilkens . | |
| 1,829,107 | 10/1931 | Nuerwell | 111/101 |
| 2,014,311 | 9/1935 | Council | 111/101 |
| 2,202,229 | 5/1940 | Owen | 111/106 |
| 2,313,604 | 3/1943 | Vogel . | |
| 2,529,336 | 11/1950 | Henderson | 111/101 |
| 2,729,493 | 1/1956 | Engel . | |
| 2,740,234 | 4/1956 | Van Norman . | |
| 3,319,988 | 5/1967 | Smith . | |
| 3,460,277 | 8/1969 | Grover et al. . | |
| 3,567,264 | 3/1971 | Baber | 294/50.7 |
| 4,539,920 | 9/1985 | Du Frene | 111/106 |
| 5,081,941 | 1/1992 | Weeks | 111/101 |

Primary Examiner—Randolph A. Reese
Assistant Examiner—Spencer Warnick
Attorney, Agent, or Firm—Haugen and Nikolai

[57] ABSTRACT

A portable tree and shrub transplanter which is easy to use by a landscaper and which reduces the shock a plant experiences during the transplantation process. The transplanter includes a rigid elongated handle extending to a blade to form a spade, wherein a rectangular frame is attached to an upper portion of the blade. The frame extends from the handle at an acute angle and receives three separate cutter blades in slots defined along the length of each side of the frame. When the blade is inserted into the earth, the frame is flush to the earth for aligning the transplanter about the plant. The blade in combination with the three cutter blades forms an inverted frusto-pyramid shaped receptacle about the root structure of the plant such that the portion of earth about the roots and the plant can be removed intact using the handle. The transplanter and plant can then be transported in a wheelbarrow to a selected location. The shock the plant experiences is reduced since the portion of earth about the roots remains confined by the defined receptacle. The transplanter is convenient to use even in packed or clay soil conditions since the blade and each of the cutter blades have a multi-pronged sharpened tip and are inserted into the earth sequentially.

12 Claims, 2 Drawing Sheets

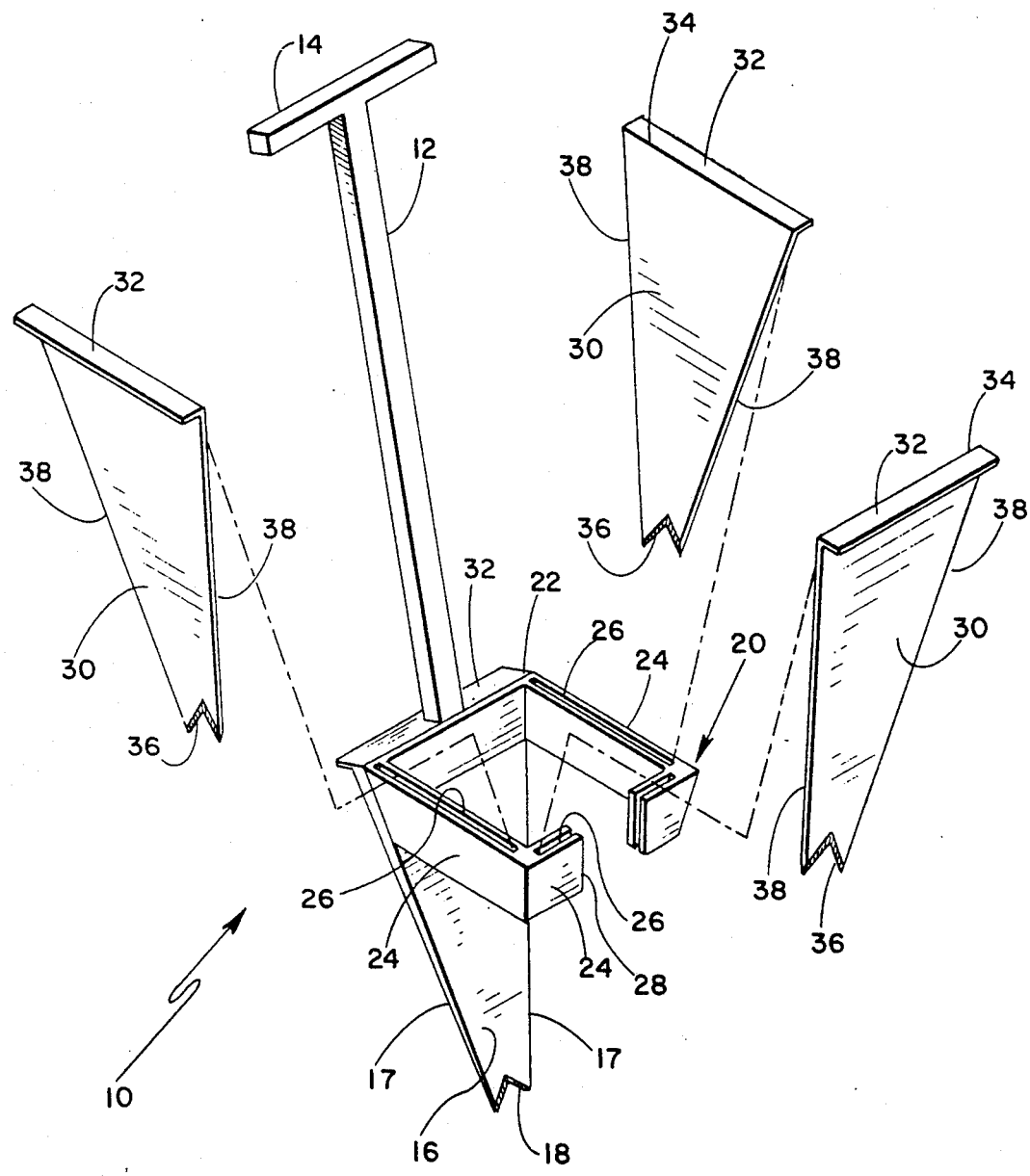

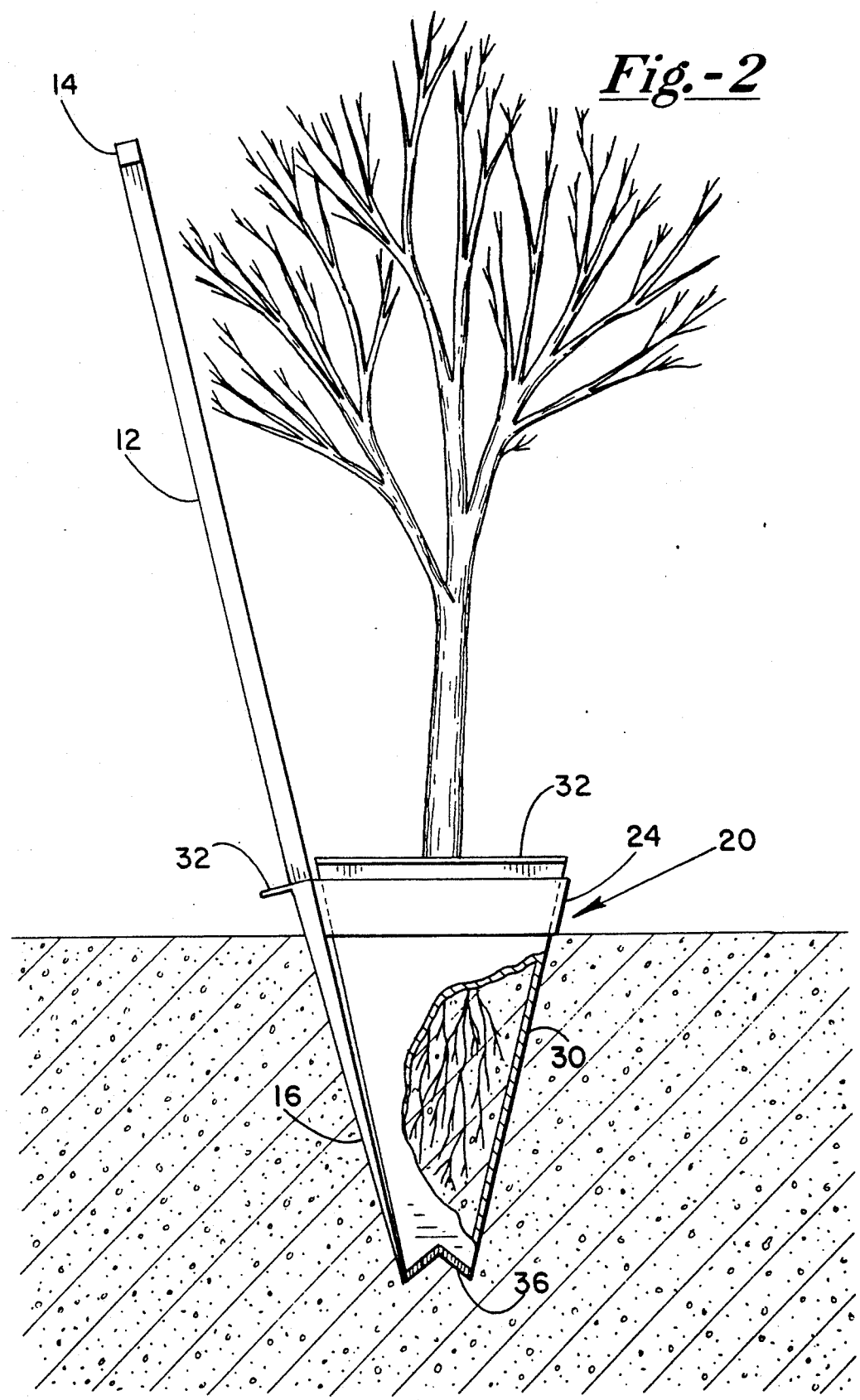

TREE TRANSPLANTER

BACKGROUND OF THE INVENTION

I. Field of the Invention

This invention relates generally to transplanters used by a landscaper to transplant plants such as trees and shrubs from one location to another and, more particularly, to a tree transplanter having several blade members which are assembled about the root structure of the tree or bush to be transplanted.

II. Discussion of the Prior Art

Transplanting trees and shrubs from one location to another, such as in a nursery or from woods into a homeowner's back yard, is a strenuous operation which requires delicate handling of the plant to help ensure the plant will survive in its new location. During the transplantation process, the plant undergoes shock because only a portion of the root structure is transplanted, and because soil conditions including the hardness and dampness also vary from one location to another. It is important that the shock, which cannot be avoided altogether, is reduced to give the young tree or bush a decent chance of survival. It is also important that the work required by the operator is minimized to reduce the risk that the landscaper may inadvertently damage the plant in the process of transplanting, which is possible when the landscaper has to put forth a great amount of effort to free the root structure from the earth.

A typical landscaper can use a standard spade to cut a section of earth around the base of the plant to loosen the roots from the earth, whereupon the spade is used in combination with grabbing the base of the plant to remove the plant from the earth and put in a wheelbarrow for transporting. Unfortunately, the trunk of the plant needs to be handled to remove the plant from the earth, which can damage the plant. Further, this also causes the root structure to separate from the portion of earth that is being removed with the plant. Some soil is dry and loose and has a tendency to separate from the portion of earth during removal and transporting which exposes the roots. Thus, when the plant is finally inserted back into the earth in a hole cut out to receive the plant, the landscaper must fill the hole about the root section where earth has fallen away. Then, the earth must be compressed by using a foot to pack the earth to ensure no air gaps remain in the earth proximate the root structure since air gaps about the roots will damage the plant.

Thus, it is important that the plant be handled as little as possible during the transplanting process, and that the earth about the root structure is remained intact while removing from the earth and transporting in a wheelbarrow. The shock the plant will go through due to the changes in soil conditions already exists, thus, the stress from the mechanical process of removing the plant should be reduced to enhance the survival chances of the plant in its new location.

U.S. Pat. No. 3,319,988 to Smith teaches an apparatus for mainly digging out sods of turf. Since sods of turf do not project from the earth, the apparatus extends above a center of the portion of sod to be removed. This apparatus would not be suitable for removing a tree or bush, however, as it would interfere with the plant being transplanted.

U.S. Pat. No. 69,642 to Disbrow teaches a transplanter having a handle extending from a three-sided form, and a single separate sliding side which completes a quadrangular form. This transplanter would be difficult to use in a packed soil, such as clay, as it requires the landscaper to simultaneously insert three sides of the form into the earth thus requiring a large amount of effort. Further, Disbrow fails to teach a method of aligning the transplanter about the plant, thus, a non-uniformly shaped portion of earth could be removed about the base of a tree which can damage the symmetry of the root structure, thus reducing the chances of survival of the tree.

U.S. Pat. No. 147,977 to Race also teaches a transplanter having a single continuous blade extending around a substantial portion of the tree to be transplanted. This transplanter requires a greater amount of effort to initially insert into the earth, and further, the handle extends above the plant which can interfere with the tree being transplanted. Further, the handle provides little leverage to maneuver the blade in the earth but rather only teaches a footrest. Thus, prying the portion of the earth and the tree from the earth would be difficult.

U.S Pat. No. 155,036 to McLeod teaches a transplanter having a pair of oppositely opposed spades coming together to form a V-shaped receptacle about a plant. This transplanter would not be suitable for transplanting trees, and further, would only be adaptable to smaller sized bushes.

OBJECTS

It is accordingly a principal object of the present invention to provide a transplanting device which is convenient to use for both trees and shrubs, and which reduces the work load on the landscaper during the transplanting process.

It is a further object of the invention to provide a transplanting apparatus which reduces the shock that a tree or bush experiences during the transplanting process.

It is a further object of the invention to provide a transplanting apparatus which can be aligned about the root structure of a tree or bush to remove a uniform portion of earth to ensure a uniform portion of root structure is transplanted with the tree or bush.

It is a further object of the invention to provide a transplanting apparatus which confines the portion of earth removed during the process such that soil cannot break away from the root structure during transportation.

SUMMARY OF THE INVENTION

The foregoing features and objects of the invention are achieved by providing a transplanting apparatus having a spade member having a frame adapted to receive several other cutter members to form an inverted frusto-pyramid shaped receptacle about the root structure of a tree. The apparatus comprises a rigid elongated shaft member having a handle at a top end and extending to a substantially planar and sharpened first blade at a bottom end to form a spade. A multi-sided frame is fixedly attached to and extends outwardly from the spade proximate an upper portion of the first blade. The frame has one side slotted to receive the stem of the tree to be transplanted, wherein each of the sides has a guide defined therein. Several sharpened cutter blades are each slidably received into the respective guides such that the combination of the cutter blades and the first blade define a substantially closed receptacle about the root structure of the tree to be transplanted. Each of the sharpened cutter blades is sequentially inserted into the respective guide defined in the respective side of the frame to reduce the work required in completing the receptacle about the root structure, especially when inserted into packed soil, such as clay.

A further improvement to the invention includes the frame lying in a plane at an acute angle with respect to the shaft member such that when the first blade is inserted into the earth at an angle, the multi-sided frame is flush to the earth to align the transplanter symmetrically about the root structure of the tree. Hence, when each of the sharpened cutter blades is inserted into the guide and into the earth, thus forming an inverted frusto-conical receptacle for instance, a symmetrically shaped portion of soil will be removed about the base of the tree. Once each of the sharpened cutter blades has been inserted into the frame to define the closed receptacle, the apparatus can be removed from the earth by prying the rigid shaft member and lifting thereupon. The combination of the transplanter and the tree may be placed in a wheelbarrow for transporting to a location selected to receive the tree. Since the formed receptacle is substantially closed, the portion of soil removed from the earth proximate the root structure will not be able to separate from the roots, thus maintaining a packed portion of soil. This arrangement reduces the likelihood that air pockets can be formed about the root structure during the transplantation process.

The guides defined in the frame preferably comprise elongated slots for receiving and reinforcing the cutter blades. Alternatively, the guides can each comprise a pair of rails defined at opposite ends of the sides on an inner surface to receive and guide edges of each cutter blade. The frame, handle and blade members are all preferably made of steel. The handle is preferably coplanar with the first blade member to avoid interference with the plant, and the blades preferably have a flanged upper portion forming a handle and a multi-pronged sharpened tip such as a two-prong dove-tail.

A hole can be formed at the location chosen to receive the transplanted tree in a similar manner. Since the hole that is formed exactly conforms to the shape of the portion of soil removed with the tree, the transplanted tree will snugly fit within the hole, thus eliminating the need to supplement the hole with dirt after the transplanting process to fill up the hole. Thus, the amount of soil packing required after the transplanting process is substantially reduced.

The transplanting apparatus is simple to use, is adaptable to both trees and plants, and reduces the shock that the transplanted tree or bush undergoes during the transplanting process.

BRIEF DESCRIPTION OF THE DRAWINGS

FIG. 1 shows a perspective view of the invention including a handle extending to a blade to form a spade, and a frame member receiving three separate cutter blades.

FIG. 2 is a profile view of the assembled transplanting apparatus according to the present invention defining an inverted frusto-pyramid shaped receptacle defined about a root structure of a tree.

The foregoing features, objects, and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

FIG. 1 is a perspective view of a transplanting apparatus according to the invention and is generally referred to at 10. Apparatus 10 comprises a square tubular elongated shaft member 12 preferably comprised of steel, having a T-shaped handle 14 formed at a top end, and extending to a sharpened and wedge-shaped blade member 16 comprised of steel at a bottom end, thus forming a spade. Blade member 16 is substantially planar wherein a pair of edges 17 each taper toward each other and toward a multi-pronged dove-tail shaped and sharpened tip 18. Blade 16 is substantially coplanar with shaft member 12. A rectangular steel guide frame 20 has a first side 22 welded to an upper portion of blade 16 such that the plane frame 20 resides in projects from blade 16 and handle 12 at an acute angle. Other methods of attaching frame 20 to blade 16, such as using rivets, are also possible and limitation to welding is not to be inferred. Frame 20 also includes three sides 24 that complete the rectangular shape of frame 20, wherein each of sides 24 is integrally formed with side 22. An elongated slot 26 is defined in each of the three sides 24 wherein each slot 26 extends from an upper edge to a lower edge of respective side 24. Each slot 26 extends longitudinally between corners of frame 20 at each end of the respective side 24 and defines a generally rectangular opening. Side 24 opposite side 22 is bifurcated by a vertical slot 28 defined about a midsection of the side for receiving a stem of the bush or tree being transplanted. Because frame 20 is comprised of steel, frame 20 is sufficiently rigid such that the two sides 24 adjacent side 22 maintain a perpendicular orientation with first side 22.

Three sharpened steel cutter blades 30 are each insertable into respective guiding slots 26 defined in each of three sides 24 to form an inverted, generally frusto-pyramid shaped receptacle about the root structure of the plant or tree being transplanted, as further illustrated in FIG. 2. Each cutter blade 30 includes an upper portion flanged outward to form a handle 32 at a top end 34. However, handle 32 could also comprise a C-shaped handle formed of steel rod welded at top end 34 or an opening formed in each cutter blade 30 to receive a hand. Each cutter blade 30 also includes a dove-tail shaped sharpened end 36 at an opposite end. A pair of edges 38 of each cutter blade 30 each taper from top end 34 toward each other to sharpened end 36 to form a wedge shape. Each dove-tail shaped sharpened end 36 bites into the earth prior to insertion into the ground. Each cutter blade 30 can be individually and sequentially inserted into respective slots 26, which guide each cutter blade, such that a reduced amount of effort is needed at any one time when inserting into the ground. Each cutter blade 30 is substantially planar and is of sufficient thickness to maintain a rigid form during insertion into the earth.

Referring to FIG. 2, assembled transplanter device 10 is illustrated to show the completed inverted frusto-pyramid shaped container positioned about the root structure of the tree. It is noted that blade member 16 and each cutter blade 30 could also be formed into a triangular-shaped wedge such that a closed inverted pyramid-shaped container would be realized. As shown, frame 20 is substantially flush to the ground and is symmetrically disposed around the base of the tree or shrub. Handle 12 extends at an acute angle with respect to the ground, and extends away from the tree to avoid interference during transplantation. Because frame 20 is substantially flush to the ground, frame 20 vertically aligns transplanter 10 about the base of the tree such that when each cutter blade 30 is sequentially inserted into respective slot 26 and into the earth, a substantially uniform and symmetric pyramid-shaped portion of earth and root structure will be removed. The height of each side 24 is sufficient to define a sufficient length of slot 26 to rigidly align each cutter blade 30 when inserted into the earth. As shown, each side 24 has a generally trapezoidal profile conforming to the shape of each received wedge-shaped cutter blade 30. Even though slot 28 defined in side 24 reduces the reinforced length of bifurcated slot 26, the bifurcated slot 26 is sufficiently long and reinforced to rigidly guide the received cutter blade 30.

In the preferred embodiment, the preferred length of each side 24 and side 22 is eight inches, wherein each has a height of two inches. Each slot 26 is preferably three-sixteenths of an inch in width and seven and a half inches long, wherein each cutter blade 30 has a width at the upper end of seven inches and a length of twelve inches. Slot 28 is preferably two inches wide, and the overall length of transplanter 10 from handle 14 to tip 18 is forty-one inches. While these dimensions are presented as a description of the preferred embodiment, limitation to these dimensions is not to be inferred.

In an alternative embodiment, each slot 26 could be replaced with a pair of protruding slots each formed on an interior surface at opposite ends of each side 24 to receive and guide respective edges 17 of cutter blades 30. Each slot could be defined by a C-shaped rail wherein each faces one another on an inside surface of guide 20 on respective sides 24. Thus, limitation to a guide 26 defined as an opening is not to be inferred.

OPERATION

Transplanter 10 is implemented by placing the stem of the bush or tree to be transplanted through slot 28 until the stem is approximately centered within rectangular guide 20. Sharpened tip 18 of blade 16 is placed to the earth wherein the user firmly grabs handle 14 and uses a foot to press upon a top portion of blade 16 on either side of handle 12. Blade 16 is urged into the earth until the bottom surface of guide 20 engages the surface of the earth in a flush orientation. Next, the operator sequentially inserts each of the cutter blades 30 into the respective slots 26 until the dove-tail shaped tip engages the earth, whereupon each cutter blade 30 is inserted into the earth using a foot. Once all three of the cutter blades 30 have been inserted into guide 20, a frusto-pyramid shaped container has been formed about the root structure of the tree such that the tree and the soil may be removed from the defined hole by lifting upon handle 14 and shaft 12. The user can place transplanter 10, including the tree, in a wheelbarrow (not shown) for transporting to the desired location for transplanting.

A hole in the earth can be prepared in a similar manner to receive a transplanted tree such that the hole will now conform to the shape of the earth removed with the tree being transplanted. Thus, transplanter 10 serves a dual purpose of first preparing a hole, and second, subsequently transplanting a tree from the earth to this prepared hole in an efficient and simple manner.

Since blade 16 and each of cutter blades 16 are individually inserted into the earth, the effort required at any given moment by the landscaper is reduced such that a tree or shrub can be removed from a packed or clay soil in a convenient manner. Thus, separately inserting blade 16 and the three cutter blades 30 which form the frusto-pyramid shaped container makes the task of transplanting more manageable. Orienting guide 20 flush to the earth ensures a uniform and symmetrical amount of earth and root structure will be removed, which is critical to reduce the shock a young tree or small bush goes through during transplantation. Because shaft 12 extends away from a vertical axis defined by the tree or shrub, the operator may maneuver handle 14 to loosen the transplanter 10 from the earth to apply a moment to shaft 12 to pry the tree from the earth.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications, both as to equipment details and operating procedures, can be accomplished without departing from the scope of the invention itself.

I claim:

1. An apparatus for transplanting plants such as trees and shrubs, comprising:

a rigid elongated shaft member having a handle at a top end and extending to a substantially planar sharpened first blade at a bottom end to form a spade;

a multi-sided frame rigidly attached to and integral with said shaft member, said frame extending outwardly from said spade proximate an upper portion of said first blade, said frame having one side having a slot to receive a stem of said plant, each of said sides having a guide defined therein; and a plurality of sharpened cutter blades each slidably received into said one of said guides, said cutter blades forming a substantially closed receptacle in combination with said first blade about a substantial portion of a root structure of said plant.

2. The apparatus as specified in claim 1 wherein said multi-sided frame lies in a plane extending from said shaft member at an acute angle with respect to said shaft member.

3. The apparatus as specified in claim 2 wherein said frame in combination with said first blade forms a rectangle and wherein said slot is defined in said side opposite said first blade.

4. The apparatus as specified in claim 3 wherein said first blade in combination with said cutter blades form an inverted pyramid-shaped receptacle.

5. The apparatus as specified in claim 3 wherein said first blade in combination with said cutter blades form an inverted frusto-pyramid shaped receptacle.

6. The apparatus as specified in claim 1 wherein said guides defined in each said side of said frame comprise an elongated slot each extending laterally from one end of said side to the other end for slidably receiving said cutter blade therein.

7. The apparatus as specified in claim 1 wherein said guides defined in each said side of said frame comprise a pair of rails, one at each end of each side of said frame, each rail slidably receiving an edge of said respective cutter blade.

8. The apparatus as specified in claim 1 wherein said first blade and said cutter blades each have a multi-pronged sharpened tip.

9. The apparatus as specified in claim 1 wherein each of said cutter blades has a flanged upper portion to form a handle.

10. The apparatus as specified in claim 1 wherein said shaft member is substantially straight and coplanar with said first blade.

11. The apparatus as specified in claim 1 wherein said frame, said first blade and said cutter blades are constructed of steel.

12. A method of transplanting a tree or shrub using an apparatus having a rigid elongated shaft member having a handle at a first end and extending to a sharpened first blade at a second end to form a spade, a multi-sided frame having an adjacent side fixedly attached to and extending outwardly from said shaft member proximate an upper portion of said first blade, said frame having one side having a slot to receive a stem of said plant, each of said sides other than the adjacent side having a guide defined therein, and a plurality of sharpened cutter blades each slidably received into one of said guides, said cutter blades forming a substantially closed receptacle in combination with said first blade about a substantial portion of a root structure of said plant, comprising the steps of:

(a) inserting the stem of the plant through said slot in said side of said frame;

(b) inserting said spade into the ground proximate the stem of said plant;

(c) sequentially inserting each of said sharpened cutter blades into respective guides of said frame to complete a substantially enclosed receptacle about the root structure of said plant; and (d) removing said apparatus with said plant from the ground by lifting upon said shaft member.

* * * * *